Nov. 6, 1934.  E. S. LEA  1,979,630

HUMIDIFIER

Filed April 4, 1933  2 Sheets-Sheet 1

Inventor
Edward S. Lea
By Davis and Davis
Attorneys

Nov. 6, 1934.    E. S. LEA    1,979,630
HUMIDIFIER
Filed April 4, 1933    2 Sheets-Sheet 2

Inventor
Edward S. Lea
By Davis & Davis
Attorneys

Patented Nov. 6, 1934

1,979,630

UNITED STATES PATENT OFFICE 1,979,630

HUMIDIFIER

Edward S. Lea, Morrisville, Pa., assignor to Fitz Gibbon & Crisp, Inc., Trenton, N. J., a corporation of New Jersey, trustee Application April 4, 1933, Serial No. 664,300

REISSUED

2 Claims. (Cl. 261—91)

Important objects of the present invention are to provide a humidifying device of generally improved design; to provide a humidifying device embodying a discharge conduit of improved design to remove all entrained drops of moisture from the humidified air before the air is discharged into a room from the device; to provide a correlation of the fan or blower of the device with said conduit, whereby the conduit will serve to muffle the noise of operation of the device and to provide a humidifying means of maximum efficiency.

Other objects of the invention will appear hereinafter.

Figure 1:
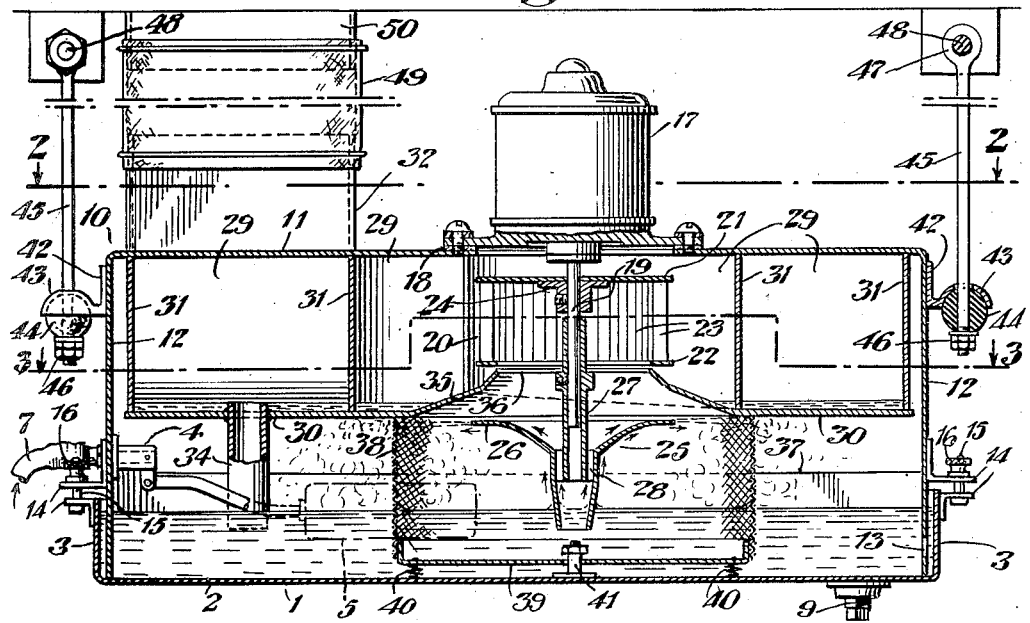
Figure 2:
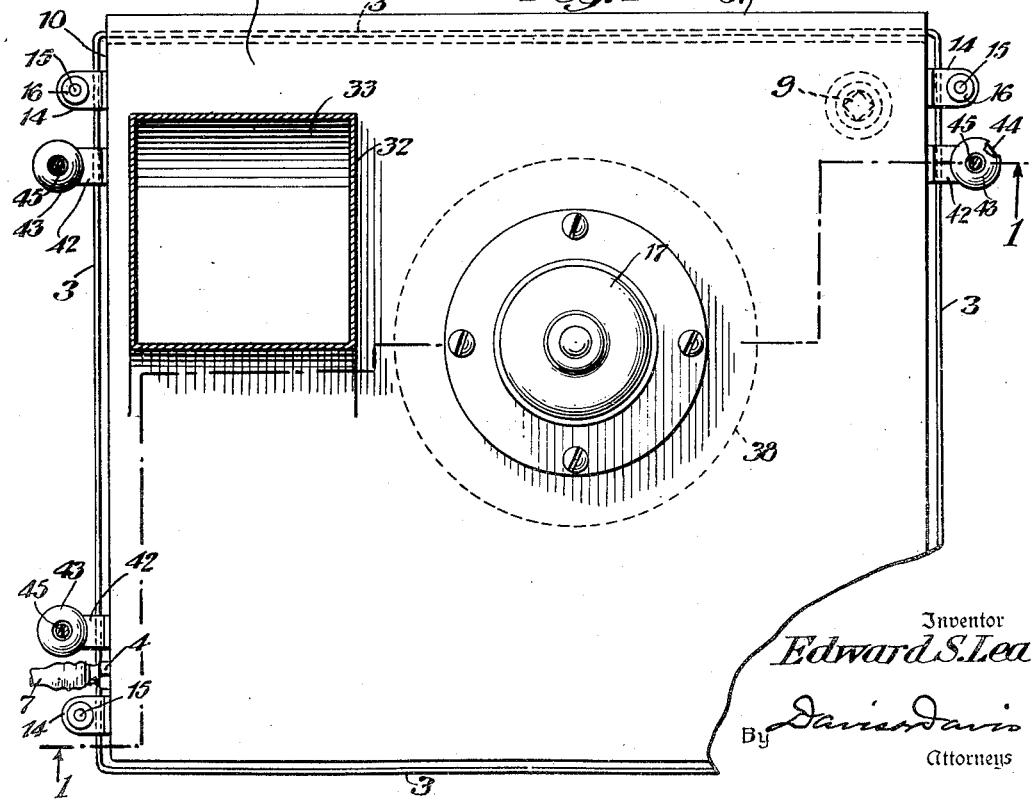
Figure 3:
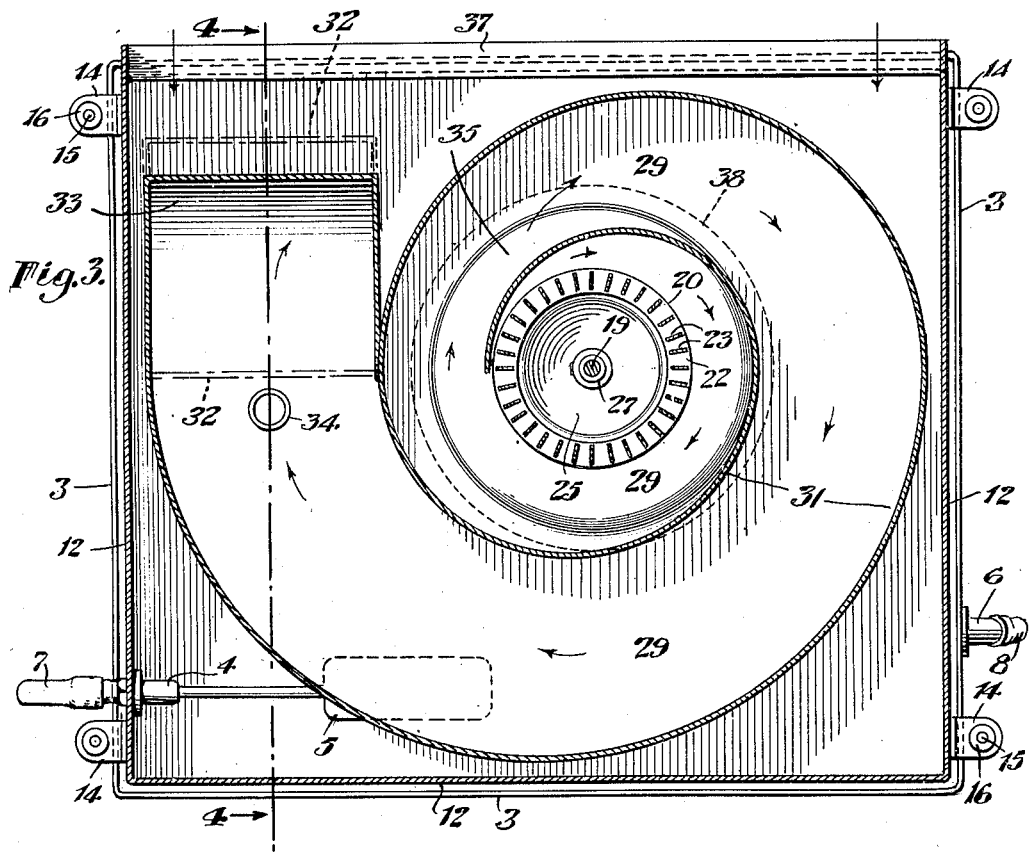

In the drawings, Fig. 1 is a vertical section taken through the humidifier, approximately on the line 1—1 of Fig. 2;

Fig. 2 a horizontal section on the line 2—2 of Fig. 1;

Fig. 3 a horizontal section on the line 3—3 of Fig. 1; and

Figure 4:
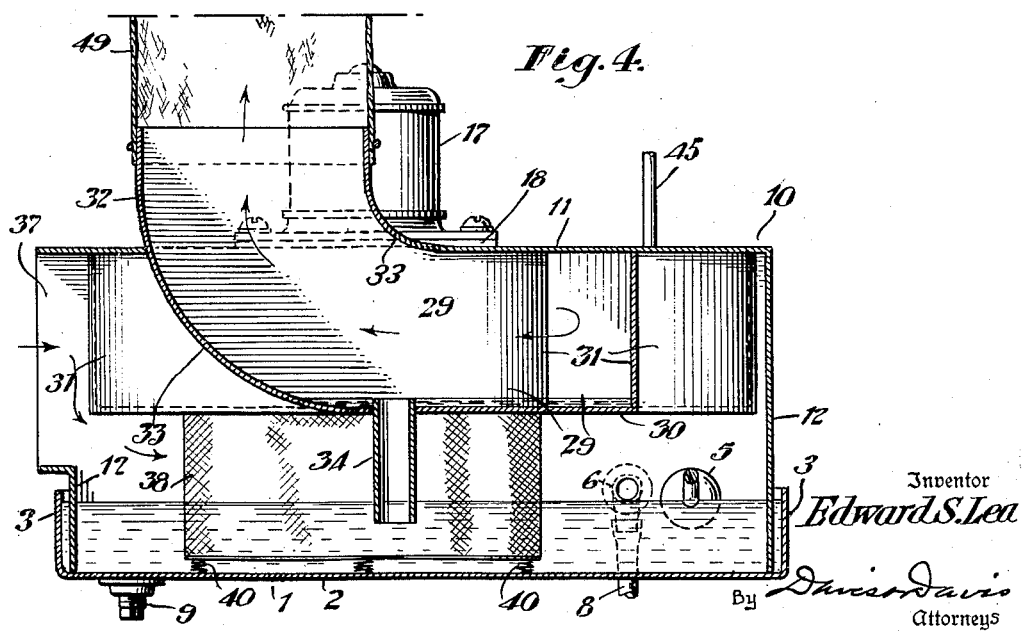

Fig. 4 a vertical section on the line 4—4 of Fig. 3.

The structure of the humidifying device comprises an upper section, which may be operatively mounted by suspension from a ceiling, and a lower section detachably secured to the upper section and removable downwardly from the latter. Said upper section includes a motor, a fan and a water dispersing device, both driven by said motor, and a discharge conduit surrounding the fan, all assembled in a unit. The removable lower section comprises a water tank or reservoir and other elements to be described hereinafter.

The water reservoir is in the form of a shallow pan 1, rectangular in plan and having a flat bottom 2 and upstanding side walls 3. At one side of the reservoir there is an inlet valve 4. A float 5 is operatively connected to said valve to control automatically the depth of water in the reservoir. One side wall of the reservoir has an overflow spout 6. Preferably a flexible delivery hose 7 is connected to the valve, and a flexible discharge hose 8 leads from the overflow spout. The bottom of the reservoir has a drain aperture which is closed by a threaded plug 9.

The structure of the upper section of the device includes a box-like casing 10 having a flat top 11 and depending side walls 12. Said casing is rectangular in plan to conform to the reservoir 1 but is slightly smaller than the latter. The side walls of the casing extend into the reservoir and their lower edges abut the bottom of the reservoir. One of the side walls bears the water inlet valve 4. There is a surrounding lateral space between the side walls of the casing and of the reservoir and the casing has an aperture 13 through which water flows into said space. To detachably join the casing and reservoir they are provided with registering brackets 14 spaced therearound. Bolts 15 are passed through apertures in the registering brackets and have thumb nuts 16 screwed thereon.

An electric motor 17 is mounted upon the upper surface of the casing 10 with its axis vertical and in a position near the center of said surface. In the present instance the motor has a supporting flange bolted to the top of the casing through a compressible sealing and vibration absorbing gasket 18. The motor has a drive shaft 19 depending into the casing and a multi-vane centrifugal fan 20 is fixed thereto. The fan is of the sirocco type. It comprises a disk-like upper head 21, an annular lower head 22 and vertical vanes 23 connecting the heads. In the present instance the vanes are straight in cross section and disposed radially, but their form and arrangement may be varied. The head 21 has a fixed collar 24 fitted on the shaft and secured thereto by a set screw. The shaft extends below the fan and bears a centrifugal water distributor 25. The latter is of substantially funnel shape. It has a reduced lower end projecting below the water level in the reservoir, and a widely flared upper end terminating in a horizontal disk-like flange 26. The mounting of the distributor comprises a sleeve 27 secured to the drive shaft by a set screw and having a spider connection 28 with the distributor.

A spiral discharge conduit 29 surrounds the fan 20. This conduit describes several convolutions in a horizontal plane. In the present instance there are two complete convolutions surrounding the periphery of the fan. The conduit is rectangular in cross section. Its upper wall is formed by the top wall 11 of the casing 10 and its bottom wall is formed by a horizontal disklike sheet 30. The side walls are formed by a strip 31 curled in spiral form and having its upper and lower edges in sealed connection with the top and bottom walls of the conduit. Said strip leads from a point closely adjacent to the periphery of the fan, spirally outward to a point adjacent one of the side walls of the casing 10. It is curled in a manner to increase the cross section of the conduit progressively from the center outward. The fan discharges centrifugally directly into the central convolution of the conduit. Directly over the outer end of the conduit the top wall of the casing is provided with an upwardly extending discharge spout 32 into which the conduit opens. The top and bottom walls of the conduit are curved upward, as at 33, to merge with the spout. A drain pipe 34 leads downward from the bottom of the conduit into the reservoir to a point below the water level. Said pipe has its upper end projecting slightly above the bottom of the conduit.

The sheet 30 forming the bottom of the conduit is dished upward directly beneath the fan, as at 35, and has an aperture 36 in register with the aperture in the lower head of the fan. This provides a suction connection between the fan and the air space over the water level in the reservoir. At one side, the casing 10 has an air inlet 37 for said air space. In the present instance said inlet extends the full width of the side of the casing. If required an air filtering device, not shown, may be connected to the inlet.

Within the water reservoir there is a foraminous screen 38 preferably of wire mesh to cooperate with the water distributor 25 to form a fine water spray for humidifying air drawn inward through the inlet 37 by the fan. This screen surrounds the water distributor 25 and extends nearly the entire vertical distance between the sheet 30 and the bottom of the reservoir. The screen has a bottom 39, and between said bottom and the bottom of the reservoir there are springs 40. The latter press the screen upward to seal its upper edge against the sheet 30 outward of the dished portion 35 thereof. The screen is held properly positioned by any suitable means such as a stud 41 on the bottom of the reservoir extending through an aperture in the bottom of the screen and having a nut screwed on it.

For humidifying the air in a house or residence the humidifier may be advantageously placed in the cellar or basement and suspended from the ceiling. For suspension of the device, the casing 10, at opposite sides thereof, is provided with brackets 42 formed with inverted hemispherical cup portions 43. Spheres 44 of rubber or other suitable compressible shock absorbing material are fitted in said cups. Vertical suspension rods 45 are passed through apertures in the spheres and cups. At their lower ends the rods are threaded and have nuts 46 screwed thereon. Eyes 47 are formed on the upper ends of the rods and are detachably anchored in any suitable manner to the ceiling, as at 48. The discharge spout 32 delivers, preferably through a flexible conduit connector 49 of fabric or other material, to a conduit connection 50 leading upward into the house.

The humidifier operates as follows: When the motor is started it drives both the fan and the underlying centrifugal water distributor 25. Rapid rotation of the latter causes water to rise thereon to the flat flange 26 and the flange flings a sheet of water or spray around the periphery of said flange and laterally against the surrounding screen 38. This causes great dispersion of the discharged water. Some of it passes outward through the screen in the form of spray, some of it descends along the screen in the form of an annular film and some of it is deflected back within the screen in a finely divided state. The rotating fan 20, by suction, draws air inward through the inlet 37, over the surface of the water in the reservoir through the screen and through the water film thereon and through the water spray and the sheet of water or spray flung off by the centrifugal device. Thereby the air is humidified. Preferably the level of the centrifugal distributing flange is quite near the level of the upper edge of the screen so that substantially all of the air drawn inward by the fan is compelled to pass through the water flung from the disk. This increases the efficiency of the humidifier.

The moisture-charged air enters the center of the fan through the aperture 36 and the open lower head of the fan and is forced outward through the many vanes of the fan. The vanes break up entrained drops of moisture in the air and force the air out through the spiral conduit 29. The conduit is quite long and its spiral wall constantly changes the direction of the stream of air. As a result entrained drops of water remaining in the stream are precipitated on the spiral wall by centrifugal force. The precipitation is assisted by the expansion of the air as it advances along the progressively enlarging conduit. Some of the water deposited on the wall evaporates into the stream of air to further humidify the air and thus increase the efficiency of the device. Excess water on the wall drains to the flat bottom of the conduit. Here it is allowed to accumulate to a slight depth determined by the projecting upper end of the drain pipe 34. The stream of air is still further humidified in passing over this sheet of water. The conduit is entirely free of baffles and it is adapted to conduct the entire volume of air discharged by the fan evenly and continuously along a true spiral path. The air emerges from the device in a highly humidified state and free from entrained drops. The device is designed throughout for maximum humidifying efficiency, and for compactness. It is also designed for inexpensive construction. The reservoir 1, the casing 10, the spiral wall 31 of the conduit and the bottom wall 30 of the conduit may all be made of sheet metal.

The humidifier is also designed to render it practically silent in its operation. The fan is entirely enclosed, and the double-coil spiral conduit surrounding it effectually muffles the noise of the fan and the operating noise of the water dispersing means by constantly changing the direction of the stream of air drawn through the water dispersing means and discharged from the fan. This is a most desirable feature of the device. Transmission of vibration to the ceiling is also eliminated by the shock-absorbing spheres in the suspension means and by the flexible fabric conduit connection 49. The drainage of water from the air discharge conduit to the water reservoir is also silent. The water flows down the inner wall of the drain pipe 34 and is deposited within the submerged lower end of the pipe.

What I claim is:

1. A humidifying apparatus comprising a water reservoir, a centrifugal device power driven on a substantially vertical axis to raise water from the body of water in the reservoir and sling it outward laterally in a sheet around its periphery, a foraminous annular screen surrounding the periphery of said centrifugal device to receive said sheet against it and having its lower end immersed in the body of water in the reservoir, to conduct water received against the screen from the centrifugal device downward and form an annular descending film of water on the screen, the screen being exposed to the atmosphere around its outer side, a centrifugal fan in suction connection with the space enclosed by the screen to draw its intake of air through said water film on the screen and through said sheet discharged from the centrifugal device, and a spiral discharge conduit surrounding the fan and having several convolutions with a continuous spiral wall, the central convolution being laterally open to the periphery of the fan to receive the fan discharge across the conduit and directly against said spiral wall and the conduit being adapted to conduct substantially the entire volume of air discharged from the fan continuously along a true spiral path.

2. A humidifying apparatus comprising a water reservoir, a centrifugal device power driven on a substantially vertical axis to raise water from the body of water in the reservoir and sling it outward laterally in a sheet around its periphery, a foraminous annular screen surrounding the periphery of said centrifugal device to receive said sheet against it and having its lower end immersed in the body of water in the reservoir, to conduct the water received against the screen from the centrifugal device downward and form an annular descending film of water on the screen, the screen being exposed to the atmosphere around its outer side, a centrifugal fan on a vertical axis and in suction connection with the space enclosed by the screen to draw its intake of air through said water film on the screen and through said sheet discharged from the centrifugal device, a spiral discharge conduit having several convolutions in the same plane and surrounding the periphery of the fan and defined by a continuous spiral side wall and by top and bottom walls, the central convolution being laterally open to the periphery of the fan to receive the fan discharge across the conduit and directly against said side wall and the conduit being adapted to conduct substantially the entire volume of air discharged from the fan continuously along a true spiral path, the conduit being also adapted to hold water at its bottom along the convolutions, and drainage means to drain water from the conduit to the reservoir and adapted to maintain a definite water level in the conduit.

EDWARD S. LEA.